United States Patent [19]

Cohen

[11] Patent Number: 4,842,224
[45] Date of Patent: Jun. 27, 1989

[54] SUITPORT EXTRA-VEHICULAR ACCESS FACILITY

[75] Inventor: Marc M. Cohen, Menlo Park, Calif.

[73] Assignee: The United States of American as represented by the Administrator, National Aeronautics and Space Administration, Washington, D.C.

[21] Appl. No.: 110,388

[22] Filed: Oct. 20, 1987

[51] Int. Cl.$^4$ .............................................. B64G 6/00
[52] U.S. Cl. ..................................... 244/159; 2/2.1 A
[58] Field of Search .................... 244/158 R, 159, 161; 114/335; 405/189, 192, 193; 2/2.1 A; 414/8

[56] References Cited

U.S. PATENT DOCUMENTS

| | | | |
|---|---|---|---|
| 2,985,129 | 5/1961 | Kirkpatrick | 414/8 |
| 3,405,406 | 10/1968 | Vykukal | 2/2.1 A |
| 3,537,668 | 11/1970 | Kosmo et al. | 114/335 |
| 3,636,564 | 1/1972 | Vykukal | 2/2.1 A |
| 4,091,464 | 5/1978 | Vykukal | 2/2.1 A |
| 4,151,612 | 5/1979 | Vykukal | 2/2.1 A |
| 4,593,415 | 6/1986 | Vykukal | 2/2.1 A |
| 4,594,734 | 6/1986 | Vykukal | 2/2.1 A |
| 4,598,428 | 7/1986 | Vykukal | 2/2.1 A |
| 4,669,413 | 6/1987 | Cummins | 114/335 |
| 4,678,438 | 7/1987 | Vykukal | 434/34 |

FOREIGN PATENT DOCUMENTS 54-8297  1/1979  Japan .

OTHER PUBLICATIONS

NASA Conference Publication 2426, "Space Station Human Factors Research Review", Proceedings of a Workshop Held at NASA Ames Research Center, Moffett Field, Calif., Dec. 3-6, 1985, published Oct. 1987.

Primary Examiner—Galen Barefoot
Assistant Examiner—Rodney Corl
Attorney, Agent, or Firm—Darrell G. Brekke; John R. Manning; Charles E. B. Glenn

[57] ABSTRACT

In a system (20) for entering and leaving a space station, a bulkhead (30) divides module (22) into an antechamber (32) and an airlock (34). A space suit (36) has a portable life support system (PLSS) interface (38) on its back. The suit is removably attached to bulkhead (30) by the interface (38) at a hatch (40) in the bulkhead (30). A PLSS (42) is detachably mounted in hatch cover (44), which is pivotally mounted at (46) to move away from the hatch (40) to allow an astronaut (48) to enter the suit (36) through the open hatch (40) and the PLSS interface. After entering the suit (36), the astronaut closes the hatch (44) and attaches the PLSS (42) to the suit (36) by operating control (52) to which glove portion (54) of the suit (36) is attached. The astronaut initiates pumpdown of the airlock (34) with the control (52). When pumpdown is complete, the astronaut opens hatch (64), disconnects the PLSS from the hatch cover 44, pivots pressure vessels (56) of the control (52) to one side on their supports (57), disconnects the glove portions (54) from the pressure vessels (56) and goes EVA.

15 Claims, 9 Drawing Sheets

SUITPORT EXTRA-VEHICULAR ACCESS FACILITY

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention relates to a novel apparatus for entering and leaving a sealed vessel in an environmental suit, such as a space suit. More particularly, it relates to an improved lock for egress and ingress to the sealed vessel. Most especially, it relates to an airlock apparatus allowing egress and ingress from and to a vessel in space, such as a space station or space vehicle.

BACKGROUND ART

The capability for extra-vehicular activity (EVA) contributes significantly to the overall productivity of humans in space. A dramatic increase in the number and complexity of tasks assigned to the pressure-suited astronaut characterizes the historical evolution of EVA from Gemini through Apollo. The Skylab EVAs demonstrated that the fundamental creativity and flexibility of humans in the space environment could compensate for mechanical and structural failure. The EVAs performed during Skylab 2 were relatively simple in terms of support equipment, yet they were crucial to the success of the mission. The Skylab Airlock Module played a critical in these EVAs and provided the first precedent for a space station EVA airlock. The first data on airlock sizing equipment stowage and free volume was obtained during the Skylab mission, as described in Skylab Experience Bulletin No. 2, Architectural Requirements for Airlock, Maynard Dalton Johnson Space Center, NASA TM 85539, June 1974.

Since 1982, the Space Transportation System (STS) places increasing emphasis upon the regular use of EVA for in flight development, recovery and repair of space systems. This trend is expected to continue on the Space Station. The dexterity of the human operator in EVA is transmitted through the human/machine interface imposed by the protective envelope of the suit; hence, significant advances in EVA capability are due primarily to improvements in the design of the space suit. The primary goal of space suit design is to reduce losses in human dexterity and in mobility to the extent possible within safety constraints. The shuttle Extravehicular Mobility Unit (EMU) represents a refinement in technology over the cumbersome pressure suits of the first EVAs. Despite these improvements, the use of EVAs on space stations will require a new generation of space suits with capabilities that exceed those of the current EMUs. In addition, the demands and constrains imposed by planned space station EVA operations necessitate the development of new hardware and procedures for EVA support, including servicing of the suit and its life support systems, suit donning and doffing and an efficient system for egress from and ingress to the space station. Further details on EVA state of the art are provided in Cohen and Bussolari, Human Factors in Space Station Architecture II, EVA Access Facility: A Comparative Analysis of Four Concepts for On-Orbit Space Suit Servicing, NASA TM 86856, April 1987.

Beginning in the 1960s NASA Ames Research Center has conducted several studies aimed at developing the technology of EVA suits. The Ames AX series suits demonstrated the use of low-friction rotary bearings between segments to achieve exceptional mobility in a hard suit. The current AX-5 suit under development at Ames Research Center incorporates state-of-the-art technology to provide excellent mobility and low leakage in a low maintenance suit with a long projected surface life. This totally hard suit is durable enough to allow work in areas that may have sharp edges and pointed structures. It is equipped with replaceable sizing rings to permit major suit parts to be used by crew members of differing body sizes. The modular construction of the suit will enable rapid repair or service change out of individual suit parts. Such suits are described, for example, in the following issued U.S. Pat. Nos. 3,405,406, issued Oct. 15, 1968 to Vykukal; 3,636 564, issued Jan. 25, 1972 to Vykukal; 4,091,464, issued May 30, 1978 to Vykukal; 4,151,612, issued May 1, 1979 to Vykukal; 4,593,415, issued June 10, 1986 to Vykukal; 4,594,734, issued June 7, 1986 to Vykukal; and 4,598,428, issued July 8, 1986 to Vykukal. U.S. Pat. No. 3,583,322, issued June 8, 1971 to Vykukal relates to a locomotion and restraint aid for EVA.

Conventional EVA as practiced on the STS utilizes "prebreathing." Prebreathing is a procedure by which the crewmember breathes pure oxygen for a number of hours prior to beginning EVA. Prebreathing reduces the risk of decompression sickness (the "bends"): the development of nitrogen bubbles in soft tissue and body fluids that may occur if suit operating pressure is low with respect to the space station cabin pressure. When the initial cabin pressure for an STS based EVA is 14.7 p.s.i., the prebreathing time is approximately 3 hours. In order to reduce this prebreathing time penalty, an operational protocol has been developed to gradually lower the cabin pressure to 10.2 p.s.i. prior to beginning prebreathing. The required prebreathing time under this protocol is reduced to approximately 1 hour.

Although this prebreathing protocol appears to be appropriate for STS operations, it would not be appropriate for the Space Station. The Space Station internal environment will be much more complex than that of the Space Shuttle. With a greater emphasis on scientific and commercial users, the requirement to accommodate these payloads in an atmosphere that regularly fluctuates between 10.2 and 14.7 p.s.i. would impose a severe hardship on users. In particular, it would become necessary to develop pressure variation testing programs on Earth for each of the the scientific and commercial users. Such a requirement would not only add cost and complexity, but for life sciences experiments especially would introduce additional variables. Finally, there would be an added cost associated with testing for flammability, toxicity and outgassing of all materials at the lower mean pressure, but with a higher partial pressure of oxygen. The arguments for a 14.7 p.s.i. space station atmosphere are persuasive. The AX-5 suit design enables the elimination of prebreathing, resulting in a first order time savings of from 1 to 3.5 hours for an EVA, depending on the air pressure used in the space station.

The current STS orbiter airlock is not pumped down for EVA. The atmosphere is bled off to vacuum and and sacrificed. This procedure is satisfactory for the shuttle, with a maximum of three EVAs per 10 day flight. However, for a space station, with daily EVAs, partly closed life support system and sensitivity to external contamination, sacrificing atmosphere is not acceptable. Therefore, it will be necessary either to pump down and save the atmosphere or to find ways to minimize or eliminate pump down.

It is also known in the art to provide access to a suit through an attachment connecting the back of the suit to a wall. Such an arrangement for a radiation protection suit is disclosed in Takimoto, Japanese Published Patent Application (Kokai) No. 54-8297, published Jan. 22, 1979. In that publication, the suit remains open to atmospheric pressure and remains attached to the wall while it is in use. An access port in the back of a pressure suit through which an astronaut enters the suit, but which remains open to atmospheric pressure, used in a weightlessness simulation system and process, is disclosed in U.S. Pat. No. 4,678,438, issued July 7, 1987 to Vykukal.

While a substantial amount of work has been done on egress from and ingress to a space vessel for EVA in space, a need remains for further improvement of egress and ingress techniques in order to meet the demands of a space station, in which egress and ingress will be a much more routine procedure than in the past.

Although the problem of prebreathing has been removed by the innovation of the AX-5 one atmosphere suit, the possibility exists that a crew member might get the bends or an embolism if he or she chose to operate the suit at a pressure lower than 14.7 p.s.i. for the purpose of obtaining greater dexterity and flexibility. Therefore, it is a requirement of the space station program that at least one of the two baseload airlocks have a "hyperbaric" capability. In hyperbaric mode, the afflicted crew member would be placed in the hyperbaric chamber with a paramedic trained companion in attendance and both would be pressurized quickly to to six atmospheres (90 p.s.i.) in order to force nitrogen bubbles in the blood back into solution. The pressure is then slowly reduced to 14.7 p.s.i. The problem of incorporating hyperbaric function into an airlock is complicated by the fact that electrical equipment cannot be allowed to operate within the chamber, so the pump must be outside the airlock, but controlled from inside. Also, the structural weight penalties of holding 90 p.s.i. can be significant in a non-optimum pressure vessel geometry.

SUMMARY OF THE INVENTION

Accordingly, it is an object of this invention to provide a system for rapid egress from and ingress to a sealed environment on a routine basis while wearing a protective suit for use outside the sealed environment.

It is another object of the invention to provide such a system for rapid egress from and ingress to a sealed environment which is capable of meeting the requirements of a space station which is permanently occupied.

It is a further object of the invention to provide such a system for rapid egress from and ingress to a space vessel in which an airlock can remain depressurized during the egress and ingress and while donning and doffing a space suit.

It is still another object of the invention to provide such a system for rapid egress from and ingress to a sealed environment in which pumpdown is virtually eliminated, except when a space suit used with the system requires resizing or repair.

The attainment of these and related objects may be achieved through use of the novel lock system for entering and leaving a sealed environment, such as a space station, in a protective suit herein disclosed. A system in accordance with this invention has a protective suit with a back having an access opening for donning and doffing the suit. A portable life support system is releasably attached to the suit at the access opening. An airlock has a hatch connecting the airlock with the sealed environment. A means releasably attaches the suit at the hatch with the access opening facing the hatch. A removable hatch cover seals the hatch. A means releasably attaches the portable life support system to the hatch cover. A user enters the suit from the sealed environment through the access opening, attaches the portable life support system to the suit, closes the hatch over the portable life support system, and detaches the suit from the hatch to leave the sealed environment. To reenter the sealed environment, the process is reversed.

The nature of the suitport lock system permits the virtual elimination of pumpdown in routine usage of the system. Only an interstitial volume between the portable life support system and the hatch need be pumped down. This represents a volume reduction from about 900 cubic feet for a conventional airlock design to about 1 cubic foot or less for the suitport. This remaining interstitial volume is so small that it could even be sacrificed rather than pumped down. Pumpdown time, power and pump cooling are therefore eliminated in this mode of operation.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
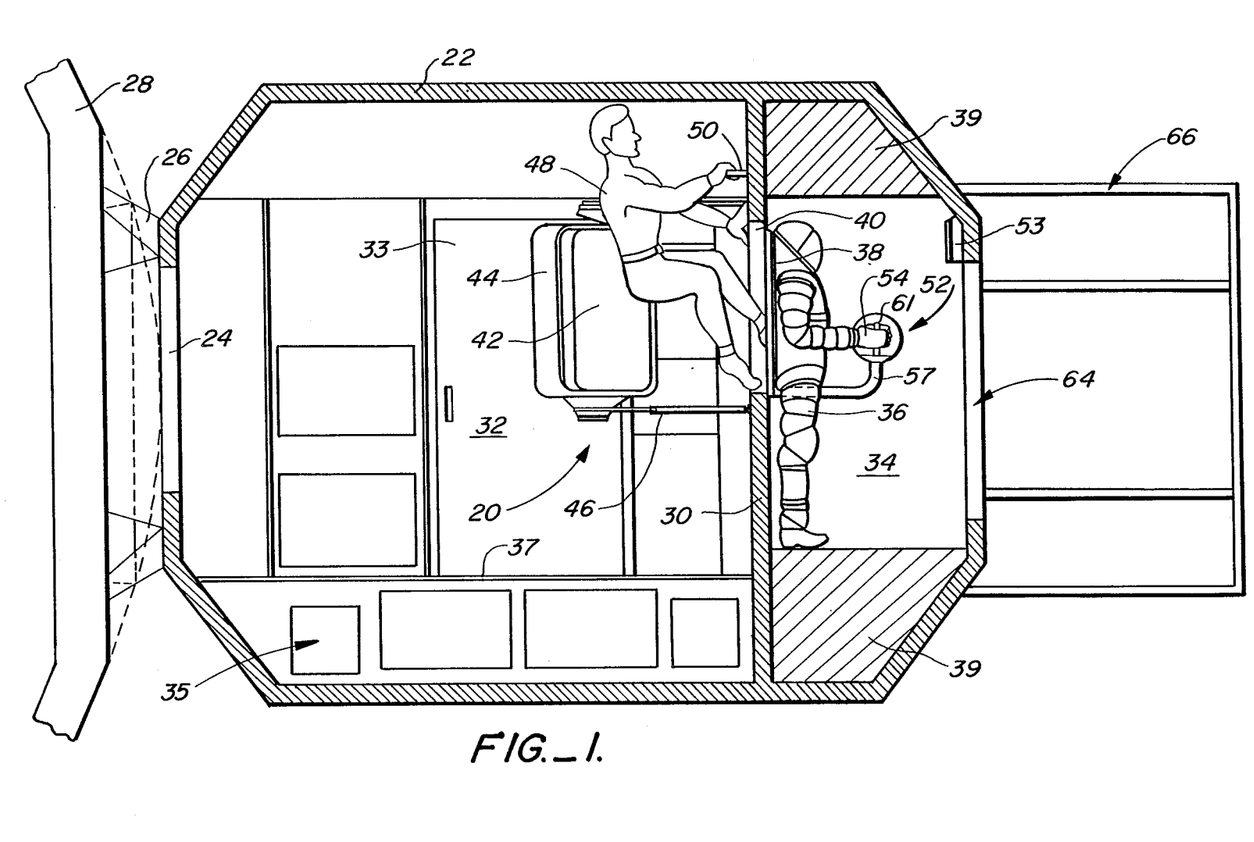
FIG. 1 is a perspective view of a suitport system in accordance with the invention.
Figure 2:
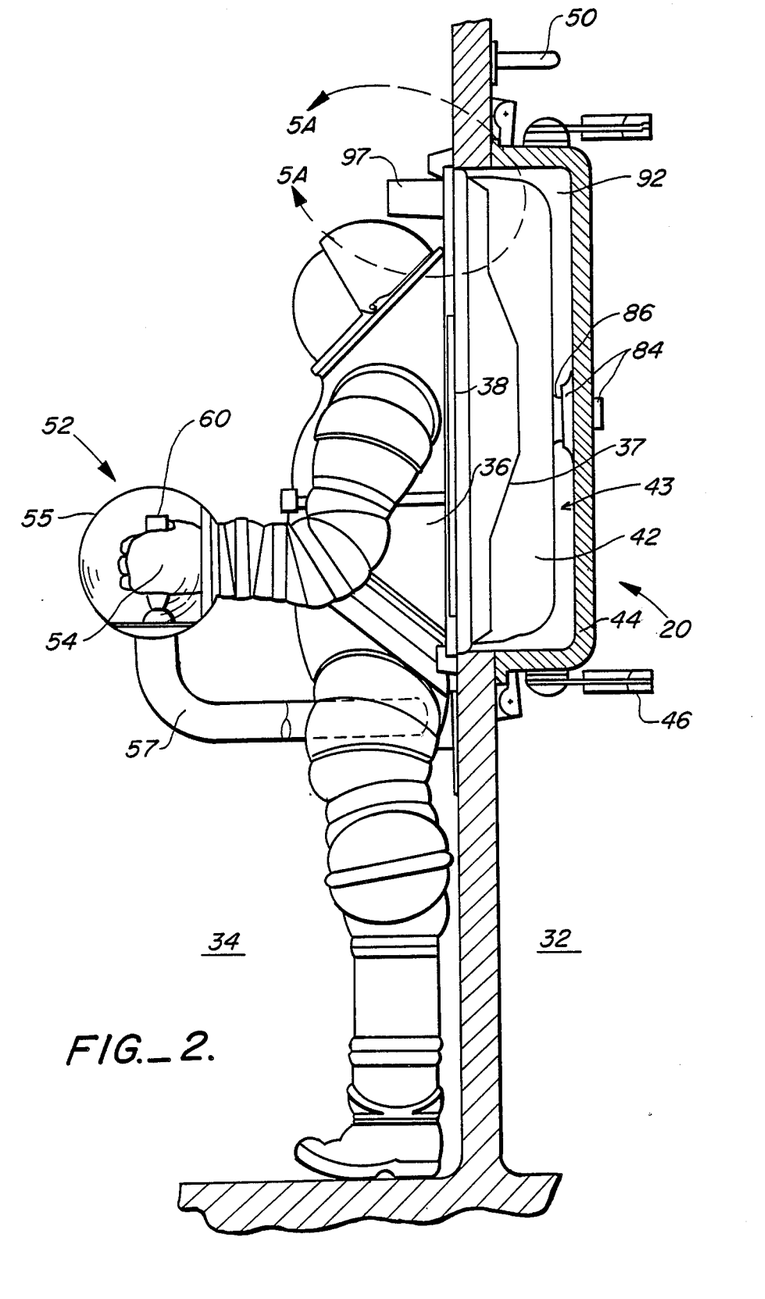
FIG. 2 is a side view with a partial section of the suitport system shown in FIG. 1.

Turning now to the drawings, more particularly to FIGS. 1-2, there is shown a suitport system 20 in two different stages of operation. The system 20 is contained in an external module 22 joined by port 24 and connection 26 to a structural pressure vessel module 28 forming part of a space station. Details on the construction of the modules 22 and 28 and their interconnection are provided in co-pending NASA patent application Ser. No. 06/588,036, filed Mar. 9, 1984, entitled "Space Station Architecture, Module, Berthing Hub, Shell Assembly, Berthing Mechanism and Utility Conduction Channel", and naming Marc M. Cohen as inventor, the disclosure of which is incorporated by reference herein. Note that a spherical pressure vessel is the structurally ideal form for an airlock, and that the spherical hubs or nodes shown in this copending application are the ideal architectural form for housing a two chamber EVA access facility, as described below.

In the system 20, a bulkhead 30 divides the basic relocatable EVA access facility module 22 into servicing antechamber 32 and an airlock chamber 34. Suit servicing support, maintenance and repair equipment 33 is located in antechamber 30. Air revitalization and life support equipment, including pumping systems 35, is under antechamber floor 37. An AX-5 type space suit 36 has a PLSS interface 38 on its back. Further details on the construction of the space suit 36 are available in the above-referenced Vykukal issued patents. The suit is removably attached to bulkhead 30 by the interface 38 at a hatch 40 in the bulkhead 30. A portable life support system (PLSS) 43 for the space suit 36 is detachably mounted in hatch cover 44, which is pivotally mounted at 46 to move away from the hatch 40 to allow an astronaut 48 to enter the suit 36 through the open hatch 40 and the PLSS interface. A hand hold 50 facilitates the entry. Such entry is substantially easier in a microgravity environment.

After entering the suit 36, the astronaut closes the hatch 44 and attaches the PLSS 43 to the suit 36 by operating control 52 to which glove portion 54 of the suit 36 is attached. FIG. 2 shows the system 20 at the completion of this operation. While the entry and hatch closing procedure can be nominally and usually carried out with the airlock 34 pumped down at the beginning of an EVA, it is at matching atmospheric pressure to the antechamber 32 as a result of installation/maintenance of the suit 36 from the antechamber 32. It is desirable at all times to minimize pumpdown volume. Therefore, the airlock 34 volume is reduced through the use of void fillers 39.

Figure 3:
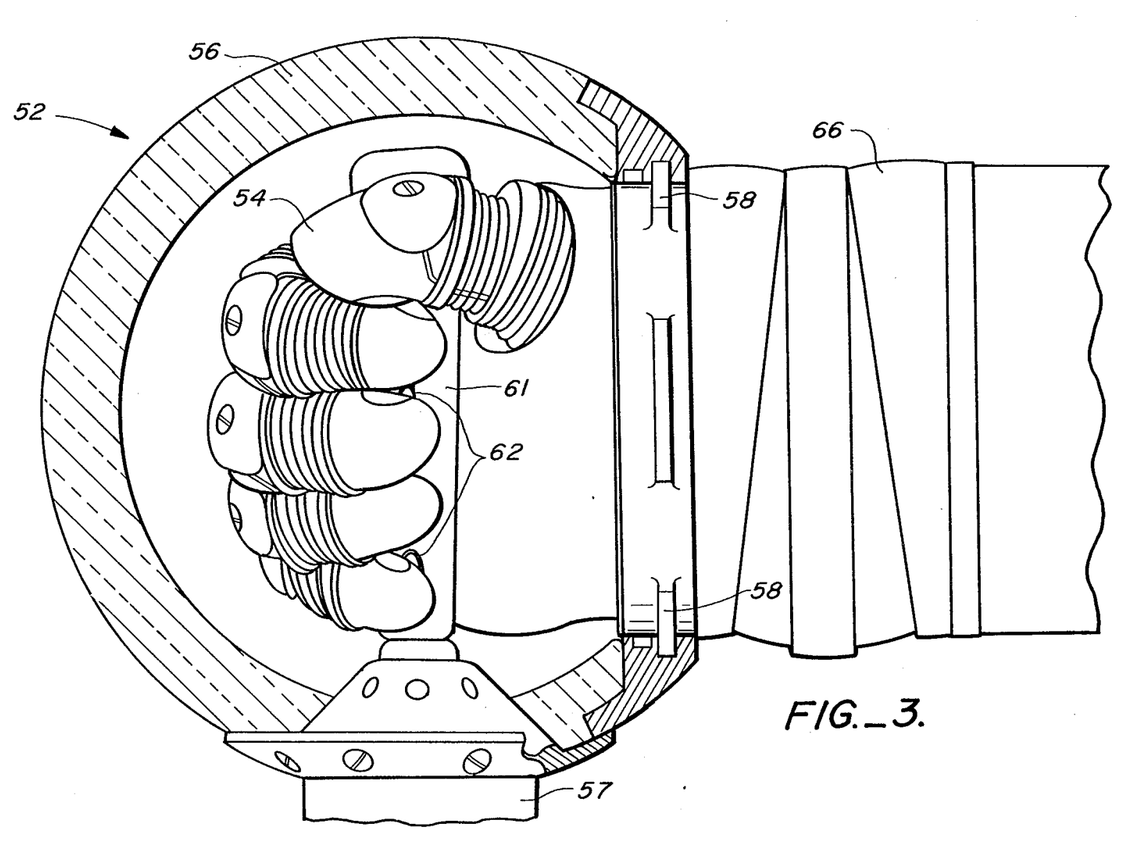
FIG. 3 is an enlarged, partial section view of a portion of the suitport system shown in FIGS. 1-2.

FIG. 3 shows further details of the operating control 52. The glove portions 54 of the space suit 36 are attached to transparent pressure vessels 55 (See also FIG. 4) and 56 by bayonet type fittings 58 to form a hermetic seal. Such an enclosure around the glove portions 54 is desirable during pumpdown of the airlock 34 because the glove portions 54 represent the most critical part of the suit 36 for failure, due to the high degree of mobility required for it and its use for manipulative tasks that may result in injury to it. The pressure vessels 55 and 56 provide back pressure to the glove to help protect it from structural failure and leakage when it might bear the full station pressure of 14.7 p.s.i. A joystick 60 and 61 having a plurality of control buttons 62 is provided in each of the pressure vessels 55 and 56. If desired, a keypad or levers can be substituted for the joystick control. A display panel 53 (FIG. 1) visible to the astronaut can also be provided to step the astronaut through the egress and ingress sequence by providing prompts, status indications and warnings as appropriate during the procedures may also be provided.

Figure 4:
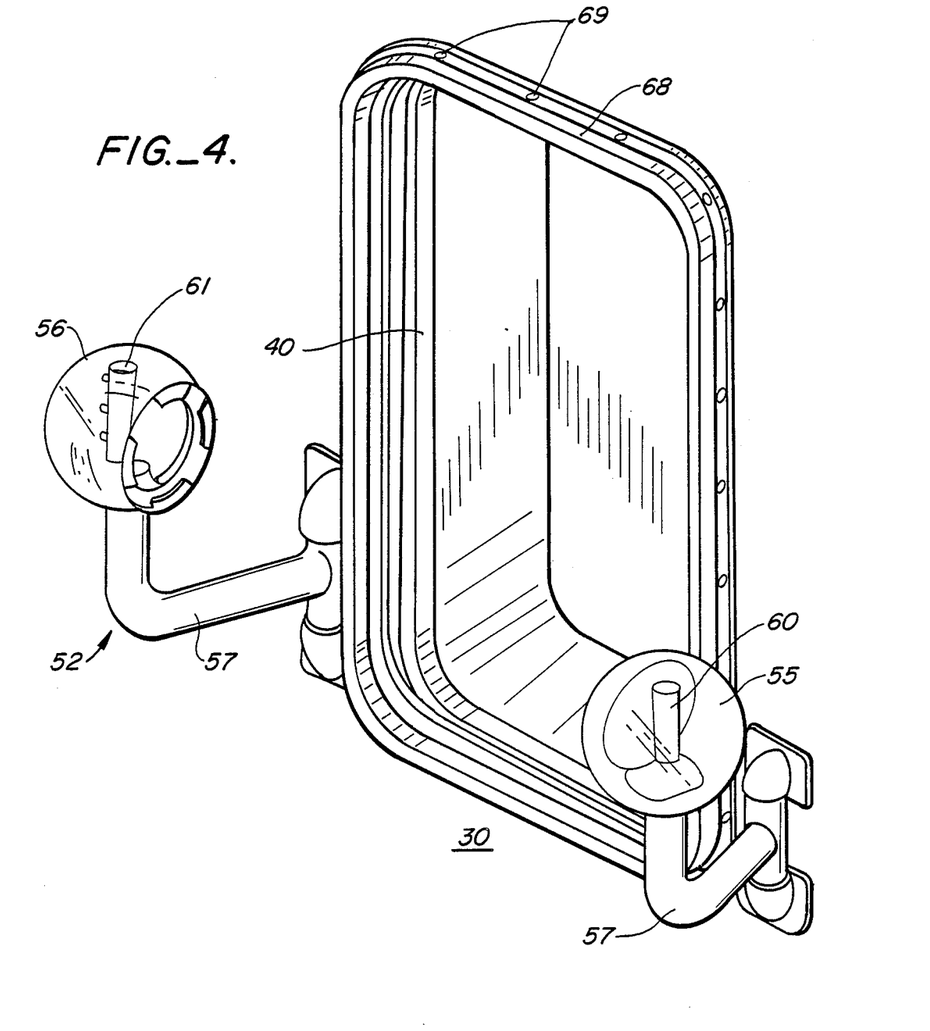
FIG. 4 is a perspective view of another portion of the suitport system of FIGS. 1-3.

After closing the hatch cover 44 and attaching the PLSS 43 to the suit 36, the astronaut initiates pumpdown of interstitial volume 43 with the control 52. When pumpdown is complete, the astronaut disconnects the PLSS from the hatch cover 44, pivots the pressure vessels 55 and 56 of the control 52 to one side on their supports 57, disconnects the glove portions 54 from the pressure vessels 55 and 56, opens hatch 64 and goes EVA. FIG. 4 shows the controls 52 and the hatch cover 44 after the astronaut has completed these procedures. A "front porch" 66 (FIG. 1) on the outside of the hatch 64 provides support for the astronaut at the beginning and end of the EVA. Outside hatch 64 need not be sealed for nominal suitport operations. However, it is kept closed during don/doff—egress/ingress operations as a safety protocol. It is opened last before exiting airlock chamber 34, and closed just after re-entering the chamber 34.

FIGS. 5A, 5B, 5C and 5D show details of AX-5 suit rear entry hatch 37, the PLSS 43 and hatch cover 44 assembly and the manner of attaching the three together and sealing suitport seal mating plate 95 against the pressure bulkhead wall 30. The PLSS 43 is attached to the pressure envelope 36 on the back of the space suit 36 by means of a flexible cable 70, which extends around the periphery of the PLSS interface opening 38 between the PLSS 43 and the suit 36. Further details on the construction and operation of such flexible cable connections are available in the above referenced Vykukal issued patents, the disclosures of which are incorporated by reference herein. The flange 68 has a circumferential projection 72 extending around outside surface 74 of the flange 68. A series of locking bars 76 of a standard AX-5 dogged disconnect in the rectangular ring flange 68 with radiused corners adjacent the suitport opening 40 are reciprocally movable (see also FIG. 4) toward and away from the flange 68. The locking bars 76 have a detent 80 shaped for mating engagement with the projection 72. With the locking bars 76 in the position shown in FIG. 5A, the suit 36 is held against the hatch 40. O-rings 82 and 83 extending around the suitport opening 40 form a sealing contact against the outside surface 74 of the flange 68 when the suit 36 is in position against the opening 40.

Figure 5A:
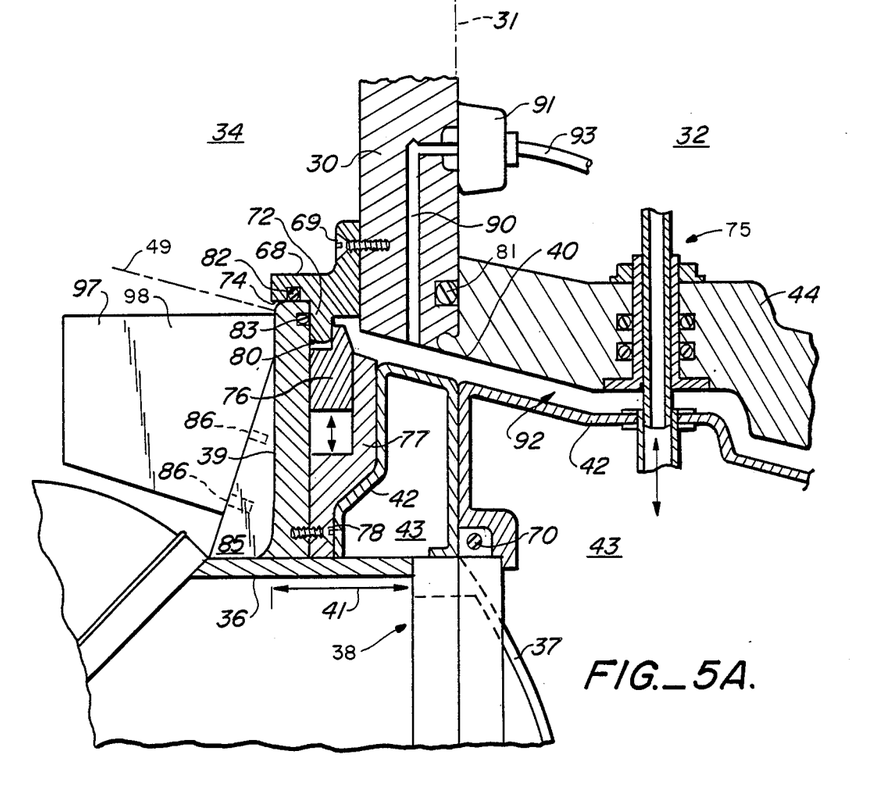
FIG. 5A is an enlarged section view of portion 5A in FIG. 2.
Figure 5B:
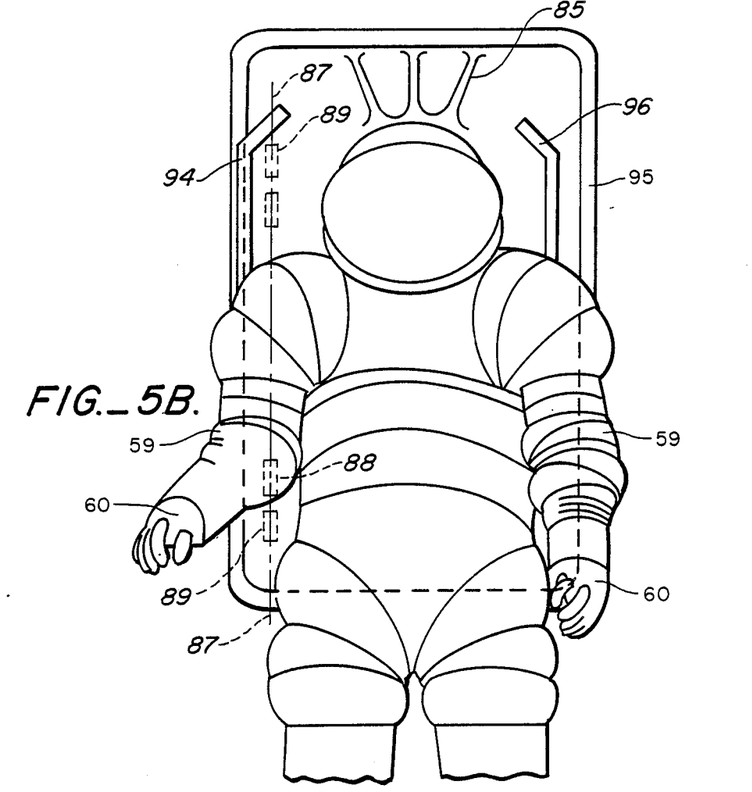
FIG. 5B is a front view of the suitport system of FIGS. 1-4.
Figure 5C:
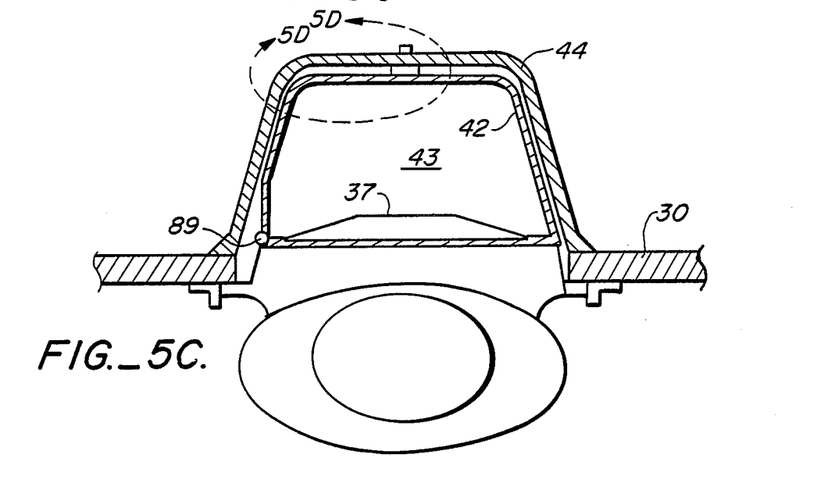
FIG. 5C is a cross-section view of the suitport system of FIGS. 1-4.
Figure 5D:
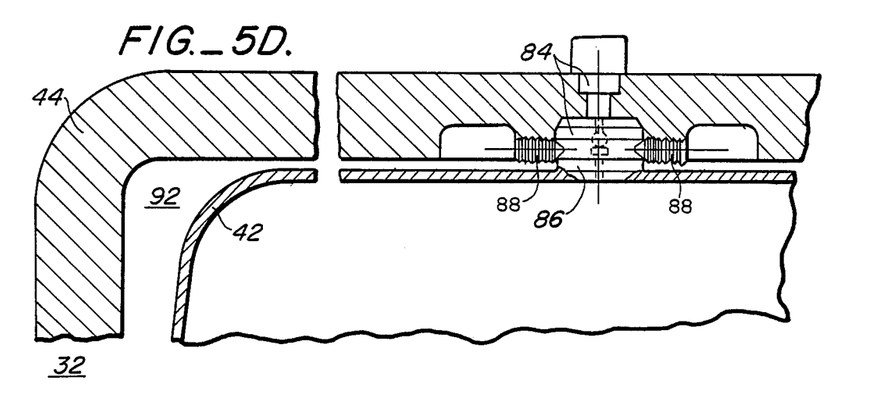
FIG. 5D is an enlarged section view of portion 5D in FIG. 5C.

A solenoid 84 is mounted on the hatch cover 44 to engage receptacle 86 on the back of the PLSS 43 to attach the PLSS to the hatch cover 44 when they are together (see also FIG. 5D). The solenoid 84 is retracted from the receptacle 86 when it is desired to separate the PLSS faring 42 from the hatch cover 44. Screws 88 allow adjustment of the position of the solenoid 84 to mate properly with the receptacle 86 on different PLSS units 42. A port 90 in the wall 30 adjacent the suitport opening 40 communicates with interstitial volume 92 between the PLSS 43 and the hatch cover 44 to allow pressure equalization between the space 92 and the airlock 34 when the suit 36 is disconnected from the suitport opening 40 for EVA and between the interstitial volume 92 and the antechamber 32 for opening the hatch cover 44 and disconnecting the PLSS 43 from the suit 36. Left linkage 96 (FIG. 5B) is a standard AX-5 rear entry hatch 37 disconnect/seal locking mechanism. Right linkage 94, mounted on suitport mating plate 95, is a modified AX-5 disconnect/seal mechanism, modified to move the bars 76 into and out of engagement with the flange 68.

In operation of the suitport system 20, the airlock 34 is normally pressurized at the beginning and ending of an EVA maneuver in order to allow access to the airlock 34 for replacing or maintaining the suits 36. However, with the suits 36 in place against the hatches 40, the PLSS 43 can be disconnected from the suit 36 and the hatch cover 44 opened with the airlock 34 pumped down. Astronauts 42 are therefore able to leave the suits 36 to reenter the antechamber 32 and reenter the suits 36 to resume EVA without repressurizing the airlock 34. This mode of operation would usually be used for a mid-mission break in the EVA, but it could also be used between separate EVAs when no maintenance or replacement of the suits 36 is required.

The egress/ingress procedure will now be explained in detail, with reference to FIGS. 5A, 5B, 5C and 5D. The egress procedure begins with the suitport EVA access facility in standby mode, with the crew members all in the space station before preparing to go EVA. The astronauts go through preliminary systems checks using computer diagnostics to determine that the suit and the facility are ready and capable for use.

The space suits are in the suitport opening 40, secured to the wall bulkhead 30 by the ensemble of mechanisms that comprise the suitport seal interface 38. The suit pressure vessel itself is pressure tested through the atmosphere umbilical 75 to ensure that it will hold the full 14.7 p.s.i. atmosphere of the space station once the inner hatch 44 of the suitport is opened.

At the start of the nominal operations, the suitport EVA access facility pumpdown chamber 34 is a vacuum, although the external hatch 64 is sealed as a safety precaution. The suit pressure vessel 36 and the interstitial volume 92 between suit 36 and inner hatch 44 are equalized to the space station cabin atmospheric pressure of 14.7 p.s.i., which communicates with the antechamber 32. Inner hatch 44 is sealed to bulkhead 30 as a safety precaution. PLSS fairing 42 is locked to inner hatch 44 by means of the solenoid mechanism ensemble 84 and 86. PLSS fairing 42 is also unlocked from the AX-5 space suit rear entry hatch 37 by means of removal or shifting of locking cable 70.

SUIT PREPARATION

To prepare the suit for EVA, the astronaut unseals inner hatch 44 from bulkhead 30 by means of a conventional disconnecting seal, not shown, and swings hatch 44 away from the suitport by means of translation pivot 46. Since the PLSS fairing 42 is locked to the inner hatch 44 and disconnected from the AX-5 suit rear entry hatch 37, PLSS fairing 42 can be easily separated from the back of the suit pressure vessel 36, of which rear entry hatch 37 is an essential part, even though rear entry hatch 37 itself is presently disengaged from the torso portion of the suit pressure vessel 36, with the left hand side latch mechanism 96 in the disengaged position. With PLSS fairing 42 detached from rear entry hatch 37, the astronauts have access to the interior portion of the PLSS 43 to perform routine pre-EVA maintenance and preparation, such as removing used rechargeable batteries and used ice pack fusible heat sinks and replacing them with the corresponding freshly charged consumables. Any other routine check-out or maintenance of the PLSS is performed at this time.

SUIT DONNING

Once the above preparations have been completed, the suit is ready for donning. The astronaut manipulates the control of cable 70 to lock the PLSS fairing 42 onto the suit rear entry hatch 37. Then, swinging the joined hatch 37 and fairing 42 wide open, both of which are still nested in and locked to inner hatch 44, the astronaut 48 enters the rear entry port of the AX-5 space suit. Using a strap which is part of the AX-5 suit, the astronaut pulls the hatch ensemble closed. He then inserts his hands and arms into the gloves 60 and arms 59 of the suit. The gloved arm is restrained at wrist lock 58 (FIG. 3), which serves as a pressure seal for the glove back pressure device 56 and which holds the arms forward at a convenient angle for donning by the astronaut. Glove 54 is conveniently located within the glove back pressure vessel with the joystick 60 and its associated buttons 62, or other mechanical or electrical programmable control device as may be used to control and operate the following egress sequence.

SEALING THE INNER HATCH

Having pulled the hatch ensemble 35 closed against the parting plane 31, the astronaut must seal inner hatch 44 to the bulkhead 30 to protect the safety of the space station cabin/antechamber atmosphere 32. Using his left gloved hand, the one that is on the same side as the AX-5 suit rear entry hatch disconnect latch control 96, the astronaut operates the joystick 60 and its buttons 62. With his left hand, he first engages the sealing mechanism between the inner hatch 44 and the bulkhead 30. Once the pumpdown chamber 34 side of this hatch is exposed to a lower pressure in the interstitial volume 92, this hatch 44 will be effectively sealed to the bulkhead 30 by the positive pressure differential on the antechamber/cabin side 32. This seal is achieved at the O-ring 81 in the bulkhead 30. However, this first left joystick actuated locking action is a precaution against a possible overpressure in the pumpdown chamber 34 or an inadvertent crew action on the inside of the antechamber 32. The status display panel 53 (FIG. 1) displays whether this locking procedure has been accomplished successfully, and will similarly display the status of all subsequent remote actuated and mechanically or electrically driven status-critical operations.

RELEASING PLSS FROM INNER HATCH

The second operation controlled by the left joystick 60 is to disengage the PLSS fairing 42 from the inner hatch 44 by actuating release of receptacle 86 by solenoid 84. Receptacle 86 is mounted to the back of the PLSS fairing 42 and solenoid 84 is mounted in imbed fashion through the inner hatch pressure shell 44.

SEALING SUIT PRESSURE VESSEL

Once the two procedures concerning the operation of inner hatch 44 are complete, the astronaut uses his left hand to press a button or sequence of buttons to initiate the pump-down or the bleed-off of the atmosphere in the left glove back-pressure device. Once this pressure is equalized with the vacuum in the pump-down chamber 34, the astronaut can rotate his hand (the AX-5 wrist joint allows considerable rotation and flexing), moving the glove 54 and the wrist seal 58. With the wrist seal disengaged, the astronaut can withdraw his gloved left hand from the left glove back pressure vessel 55. He then moves his left arm freely to grasp the AX-5 rear entry hatch latching mechanism 96 and operates it to engage the lock and seal of the AX-5 suit. The integrity of this seal is verified by a display device in the suit helmet.

EQUALIZING ATMOSPHERES

With the suit pressure vessel 36 sealed and tested/verified for integrity, the astronaut can begin the sequence of equalizing pressure of the interstitial volume 92 with the vacuum in the pumpdown chamber 34. Using the right joystick 61 and its associated buttons 62, the astronaut initiates the pumpdown or bleed-off of interstitial volume 92 through air equalization port 90. Should the astronaut wish to modify the environment in the suit, this may be done with the right joystick control device 61 and associated buttons 62. Typical modifications are to reduce the suit pressure to the range of 8.6 to 9.5 p.s.i, which are the lowest pressures to which it is possible for a human being to go without requiring prolonged prebreathing to avoid the bends. The advantage of a lower pressure may be greater mobility in some parts of the space suit and improved dexterity in the gloves in particular. Another atmospheric modification might be to increase or reduce the temperature of the suit cooling system. A third such modification might be to adjust the relative humidity in the air revitalization system. The astronaut would monitor the effects of these changes on the conditions inside the suit through the use of displays mounted inside the suit helmet, as well as his own sensory experience.

Once these suit environment modifications are initiated, if any, the astronaut must activate the PLSS to support his vital life functions throughout the course of the EVA to follow. The general procedure is that, as each of the major PLSS functions is activated, the external life support connected from the suit servicing support antechamber is deactivated. Once all the PLSS functions have been checked and verified as properly operational, the umbilicals are all withdrawn from connection with the PLSS.

UMBILICALS

During the entire time that the suit is in the suitport until shortly before EVA, the suit life support functions performed by the PLSS during the EVA are performed when attached to the suitport by equipment in the suit servicing support antechamber 32 and carried to the PLSS by umbilicals which plug by remote actuators. These umbilical connectors are based on the fluid and electrical connectors and pressure wall imbeds shown in FIG. 6 of the above-referenced Cohen application and plug into the PLSS 43 through the PLSS fairing 42. There are four sets of umbilicals: cooling water supply and return (fluid type), atmosphere revitalization supply and return (fluid type), electrical auxiliary power (electrical type) and computer diagnostic (electrical type). These actuator mechanisms are all mounted on inner hatch 44 and are all controlled by the astronaut using his gloved right hand on the right joystick control device 61 and its associated buttons 62.

DISENGAGING THE SUIT FROM THE SUITPORT

Once the astronaut has transferred all life support functions to the activated PLSS and withdrawn all the remote actuated umbilicals, he is ready for the final suitport egress procedure. In an operation similar to that performed earlier in the egress sequence with the gloved left hand, he depressurizes the right hand glove back-pressure device, rotates and disengages the wrist lock ring from the wrist lock ring receptacle 59. Then with his right hand and arm moving freely, he grasps the right hand side AX-5 type latching lever 94, which controls the mating plate disconnect linkage. This direct mechanical linkage withdraws dogged disconnect bar 76 from engagement with mating plate retaining flange ring 68 into the dogged disconnect retaining ring 77. The pressure seal of O-ring 82 and O-ring 83 breaks. The astronaut is able to move the mating plate 95 away from the suitport interface opening 40. While still in the EVA access facility pumpdown chamber, the astronaut does a final check on the suit and PLSS. He activates the cameras 97 and the lights 98 that are mounted to the mating plate 39 by bolts into the threaded mounting points 86, which are tapped into the mating plate gusset stiffeners 85. Finally, the two astronaut buddy team open external pumpdown chamber hatch 64 and step out of the airlock zone onto the front porch 66 (FIG. 1). The egress process is complete.

INGRESS PROCEDURE

The ingress procedure is the exact practical reciprocal of the egress procedure, with a few differences driven primarily by safety protocols. External hatch 64 remains open while the astronauts are out EVA, so that, in the event of an emergency, they will have as few as possible obstacles to reentering the space station. This reentry can occur through the suitport or by repressurizing the pumpdown chamber and opening or taking apart the AX-5 suit with an incapacitated person inside.

The nominal ingress procedure may be summarized as follows. The astronaut and his buddy reenter the pumpdown chamber 34 from the vacuum of space through external hatch 64, which they close and seal as a safety precaution even if there is no need to pressurize the pumpdown chamber. Then they turn their backs toward the suitports and using mirrors, the alignment with the glove back-pressure devices 55 and 56 or lines on the floor, walls or ceiling, gently push themselves backwards, so that the PLSS fairing 42 engages the self-seating taper 49 of the suitport opening 40 and the inner hatch 44. Using the right side latching mechanism, they lock the mating plate to the pressure bulkhead 30.

Each astronaut then inserts his right hand into the glove back-pressure device, and using the controls therein, he remotely actuates the umbilical connectors to take over the functioning of the life support system. This handover of function must occur early in the ingress and reentry process in case the astronaut is running short on supplies of power, cooling or air in his PLSS. With lie support turned over to the station, the astronaut begins the series of pressure equalizations, equalizing the pressure in the interstitial volume 92 with the space station cabin atmosphere, and if necessary, raising the pressure in the space suit from a reduced pressure to the 14.7 p.s.i. of the station cabin. With the interstitial volume at suit pressure equalized to the cabin atmosphere, the astronaut may now use his left hand to manipulate the left hand latch mechanism 94 that unseals the the AX-5 suit rear entry hatch 37. The astronaut then places his left gloved hand in the left glove back-pressure device, locks the wrist and uses the controls to operate the entry hatch ensemble comprised of 37, 42 and 44, with the attachment between the solenoid driven attaching member 85 and receptacle 86. Penultimately before the doffing the suit, the astronaut uses each of his still-gloved hands to activate glove back-pressure devices in order to protect the gloves, the most vulnerable part of the suit. The final procedure is to use the left joystick and buttons to disengage the inner hatch from the bulkhead suitport opening. Finally, the astronaut can push with his back against the rear entry hatch 37 and pull himself out of the suit.

From the above description of operation, it can be seen that all of the controls that are bound to the EVA access facility are contained in the two glove back-pressure devices. All of the controls that are essential to suit function during an EVA are attached to the suit. The two critical mechanical linkages 94 and 96 that are both critical to the integrity of the suit pressurized environment are both mounted on the suit itself. For each of the control functions performed by the joysticks 60 and 61, there is a manual override in the EVA access facility antechamber. However, for every vital function controlled by suit-mounted mechanisms, there is no equivalent manual override within the EVA access facility except for computer diagnostics when the suit is mated to the suitport interface 38.

FIGS. 6-13 show different orientations of suitport systems that could be used in a space station.

Figures 6, 7, 8, 9, 10, 11, 12, 13:
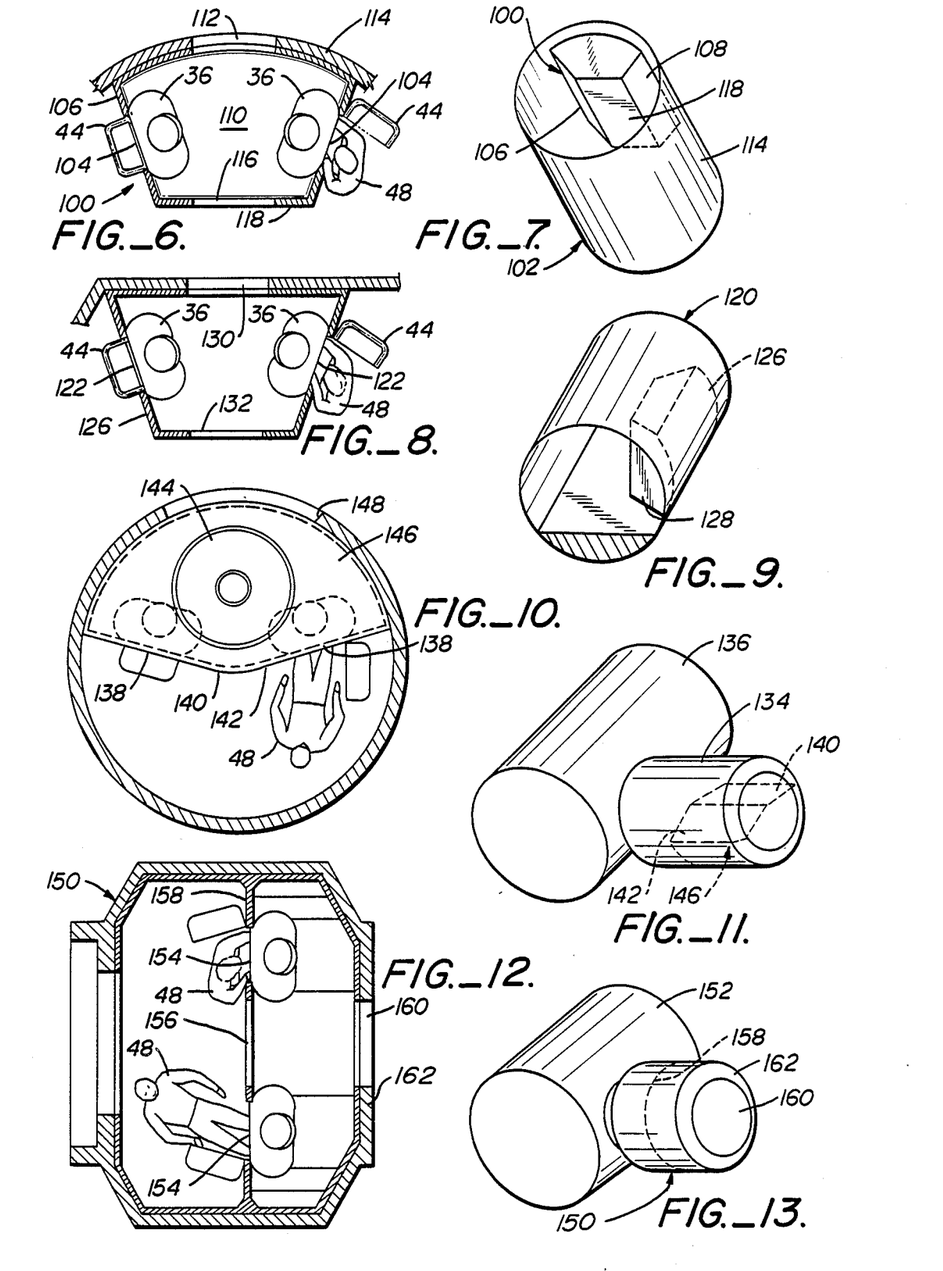
FIG. 6 is a top view of a second embodiment of a suitport system in accordance with the invention.
FIG. 7 is a perspective view of the suitport system of FIG. 6.
FIG. 8 is a top view of a third embodiment of a suitport system in accordance with the invention.
FIG. 9 is a perspective view of the suitport system of FIG. 8.
FIG. 10 is a top view of a fourth embodiment of a suitport system in accordance with the invention.
FIG. 11 is a perspective view of the suitport system of FIG. 10.
FIG. 12 is a top view of the suitport system of FIGS. 1-4.
FIG. 13 is a perspective view of the suitport system of FIGS. 1-4.
Figure 14:
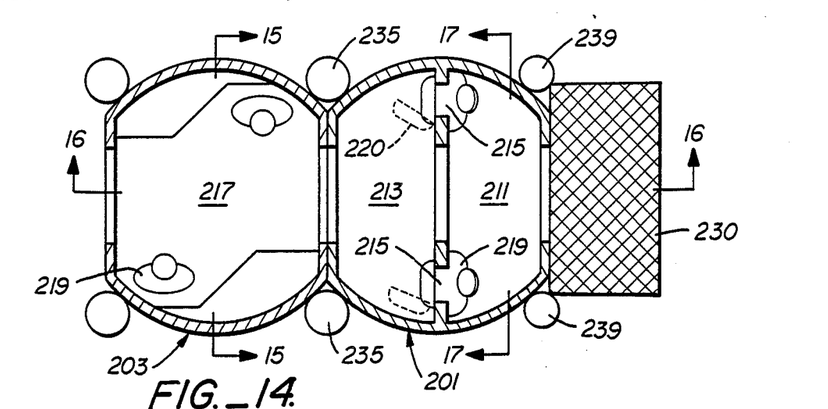
FIG. 14 is a top view of another embodiment of a suitport system in accordance with the invention.
Figure 15:
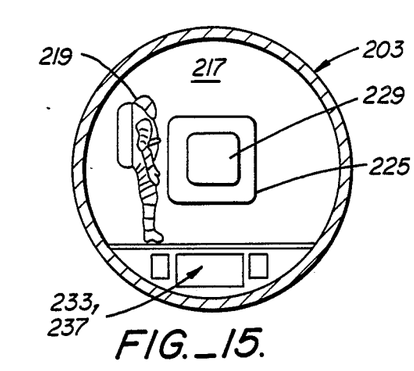
FIG. 15 is a cross-section view, taken along the line 15—15 in FIG. 14.
Figure 16:
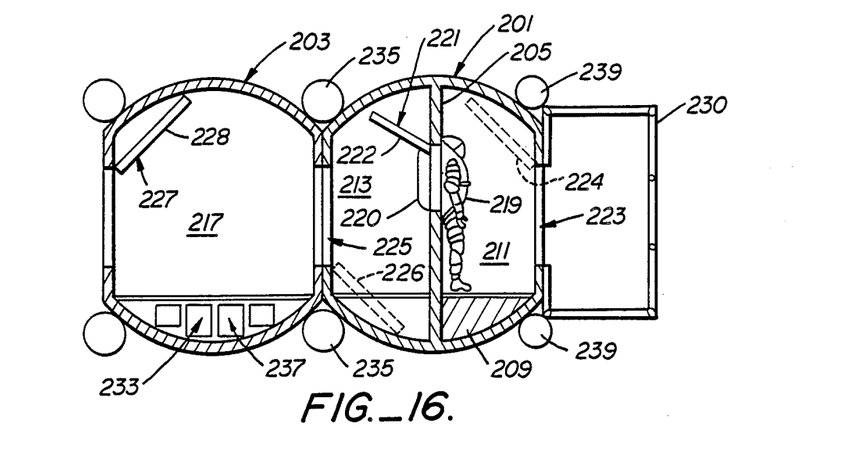
FIG. 16 is another cross-section view, taken along the line 16—16 in FIG. 14.
Figure 17:
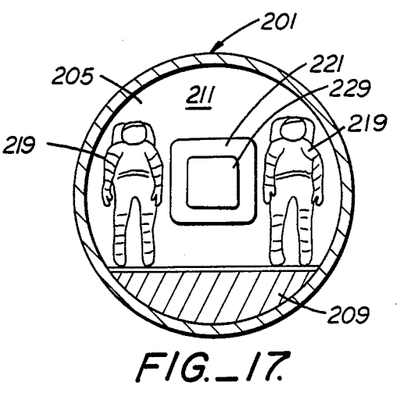
FIG. 17 is still another cross-section view, taken along the line 17—17 in FIG. 14.

FIGS. 6 and 7 show a suitport system 100 in a "vertical" space station module 102, i.e, in which the system 100 extends along the axis of the cylindrical module 102. A pair of suitport hatches 104 are provided in the walls 106 and 108 of the airlock 110. Exit hatch 112 is provided in wall 114 of the cylindrical module 102. A service hatch 116 in wall 118 of the airlock 110 allows access to the airlock for removal and replacement of the suits 36 and other maintenance.

In FIGS. 8 and 9, module 120 is "horizontal," and suitport hatches 122 are in the walls 126 and 128. The exit hatch 130 and the service hatch 132 are positioned as in FIGS. 6 and 7.

In FIGS. 10 and 11, a "vertical" external unit 134 extends from space station module 136. Suit port hatches 138 are in walls 140 and 142, and service hatch 144 is Wall 146. Exit hatch 148 is positioned as in FIGS. 6-9.

In FIGS. 12 and 13, a "horizontal" external unit 150 extends from space station module 152. The suitport hatches 154 and the service hatch 156 are in the wall 158 extending across the unit 150, and the exit hatch 160 is in end 162 of the module.

The embodiments of FIGS. 10-13 are independent and relocatable to any berthing port on a space station to the extent that they carry their own life support system. If the EVA access facility must "slave" off another module's life support system, their relocatability is limited to berthing ports with the necessary life support utilities available.

FIGS. 6-13 illustrate the diversity of the volumetric architectural contexts in which the suitport can be installed. These figures demonstrate that the suitport system and its accompanying architecture and ergonomics is independent from any given space station architecture and can be adapted to virtually any space station architecture. However, FIGS. 14-17 show an optimum embodiment of the suitport as an external, truly relocatable suitport EVA access facility that maximizes the operational capabilities made possible by this system.

In this embodiment of the suitport EVA access facility, the suitport is installed in a bulkhead 205 that bisects a spherical airlock module 201. The spherical module 201 is based on the spherical hubs or nodes shown and described in the above-referenced copending Cohen application. The spherical module 201 is the ideal geometric form for a pressure vessel or airlock, as it allows the smallest surface area to volume ratio, and therefore the smallest structural weight to volume ratio possible.

By adding a second spherical module 203 for the suit servicing chamber, a significant increase in operating capability is made possible, specifically, the transfer of large pieces of freight or equipment and safe and efficient hyperbaric operation.

The key to this increased capability is the manner in which the two spherical modules 201 and 203 can be operated together. In the airlock 201 are two separately pressurizable module chambers, a pumpdown chamber 211 and a don/doff antechamber 213. These two chambers 211 and 213 are separated by bulkhead 205, which is penetrated by three openings: two suitports 215 and a large general purpose hatch 221. In addition to hatch 221 in bulkhead 205, there are three other similar general purpose hatches, an external access hatch 223, an inter-spherical module hatch 225 and service chamber to station berthing port hatch 227. Each one of these hatches has a window 229 to facilitate observation of activities. Hatches 221, 223, 225 and 227 respectively translate to stow in positions 222, 224, 226 and 228.

Altogether, these four pressure hatches 221-227 seal to define three separate pressurizable volumes, i.e., the pumpdown chamber 211 between hatches 221 and 223, the don/doff and stowage chamber 213 between hatches 221 and 225, and the servicing chamber 217, which is contained in spherical module 203 between hatches 225 and 227.

Although all three of these chambers could be isolated each from the other at different atmospheric pressures, in practical operations, two adjacent chambers will always operate together at the same pressure while sealed off from the third chamber at a different pressure. Thus, in most routine or nominal operations, service chamber 217 will operate at the same pressure as don/doff antechamber 213, typically 14.7 p.s.i, and the pumpdown chamber 211 will operate at a different pressure, typically 0 p.s.i. to be compatible with the vacuum of space.

Figure 18A:
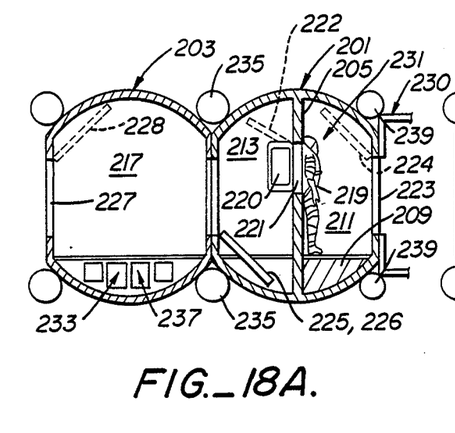
FIGS. 18A-18F are cross-section views of the suitport system in FIGS. 14-17, corresponding to FIG. 16, but with the system in different operational modes.

This nominal operating condition is illustrated in FIG. 18A for nominal don/doff and routine maintenance, where hatch 221 in bulkhead 205 is sealed, and the suits 19 provide a seal to the atmosphere in the servicing chamber as the suitport hatches 220 are open to allow don/doffing. Hatch 223 to the vacuum of space is closed as a safety precaution. Hatch 225 is open to allow convenient access to the don/doff antechamber 213, which is at the same 14.7 p.s.i. pressure as the servicing chamber 217. On the other side of the bulkhead 205, pumpdown chamber 211 is evacuated to vacuum, although hatch 223 is closed as a safety precaution.

Figure 18B:
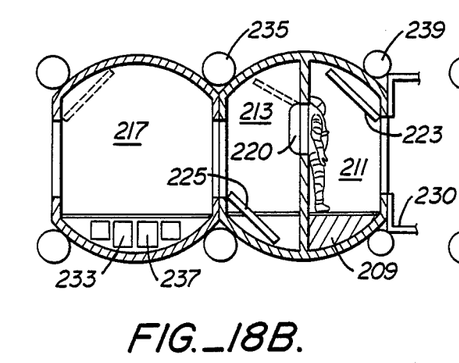

In FIG. 18B, the same routine operational procedure pertains except that the astronauts have donned or entered the suits 219 and pulled the suitport hatches 220 closed behind them. Now these hatches 220 are sealed to bulkhead 205, allowing the interstitial volume 43 to be pumped down or bled off, so that the astronauts may safely separate their suits 219 from the bulkhead 205 and move through the pumpdown chamber 211 to the external hatch 223. The astronauts open this hatch easily as the pumpdown chamber 211 is already at vacuum, and they step out onto the "front porch" 230.

Figure 18C:
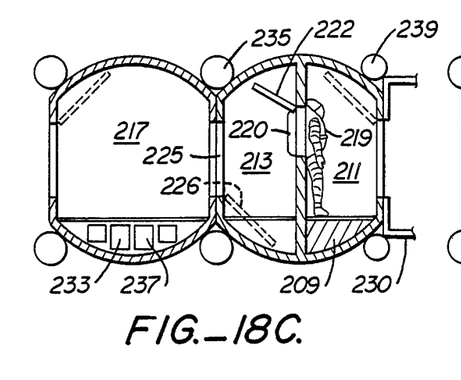

In FIG. 18C, the astronauts must move a large piece of equipment, known as an "orbital replaceable unit" (ORU) from the vacuum of space through the entire EVA access facility and into the interior modules of the space station. Current space station systems requirements define the largest ORU size as 84 inches long by 42 inches wide by 36 inches deep. To accommodate this large ORU, the general purpose hatch is defined as a 50 inch square with 12 inch radiused corners. These dimensions are given to provide a frame of reference for the ORU transfer problem.

Moving the ORU through an airlock or EVA access facility requires a much greater longitudinal volume than would normally be needed for routine EVAs. Therefore, the suitport EVA access facility has the capability of employing the entire spherical airlock module 201 for this type of contingency. An airlock that is sied always to pump down the volume necessary to the maximum size ORU would be vastly less efficient than the suitport, using perhaps three or four orders of magnitude more atmosphere for each EVA cycle. Bulkhead 205 reduces the non-routine pumpdown volume by 50 percent. The void fillers 209 under the floor and wherever else practicable reduce the pumpdown volume by a further 10 to 25 percent for non-routine operations. For routine EVA access operations, the suitport offers a reduction in pumpdown volume of approximately $9 \times 10^2$, for a spherical airlock 12 feet in diameter.

$$4/3\pi R^3 = \frac{\pi D^3}{6} = 904 \text{ ft}^3,$$

almost three orders of magnitude over a 1 ft$^3$ or less interstitial volume. This volume savings translates to a significant time, power, pump cooling savings and a reduction in atmosphere loss.

The time savings will vary from 20 to 60 minutes, depending on the amount of power available for airlock pumpdown, assuming that the air is recompressed in a high pressure spherical air bottle external to the space station EVA access facility module at a compression ratio of 1 to 10 for a resultant pressure of about 150 p.s.i. Some proposals recommend simply pumping the air back into the servicing chamber or into the main interior of the space station at a much lower compression ratio or at a similar high ratio in a much shorter period of time.

The problems with this approach are increased atmospheric loss, especially since, even with a 10 to 1 compression ratio, for a 900 ft$^3$ sphere, approximately 90 ft$^3$ of the original 14.7 p.s.i. air would remain to be sacrificed each EVA. Bigger pumps mean more power or time. Also, contamination of cabin air from an external chemical spill, such as hydrazine rocket fuel or hypergolic fuel is a major concern. With pumpdown to an isolatable pressure vessel which can be vented subsequently to vacuum, it will be much easier to protect the vital interior cabin air from dangerous contamination and protect the delicate life support system from failure.

FIG. 18C shows an ORU 231 being transited through the EVA access facility. In this operational mode, hatch 225 is sealed between service chamber 217 and the don/doff antechamber 213. Then 213 is pumped down to vacuum, so that hatch 221 in bulkhead 205 can be opened by the astronauts. The astronauts then place the ORU inside the airlock module 201, so that it passes through hatch 221. The astronauts may choose to pass into the interior of the station with the ORU, or they may choose to stay out EVA in vacuum, while other crew members complete the transfer from inside the station. To complete the transfer of the ORU in either case, the astronauts close and seal hatch 223, closing the airlock module 201 off from vacuum. Then the entire module 201, including both the pumpdown and don/doff chambers, are pressurized to 14.7 p.s.i. Once pressurization is achieved, hatch 225 can be opened and crew members can handle the ORU in a "shirt-sleeves" environment in which it is much easier to be dextrous than in even the best space suit. To readmit astronauts to the pumpdown chamber from EVA, the EVA access facility will be returned to the operational mode described with FIG. 18B.

Figure 18D:
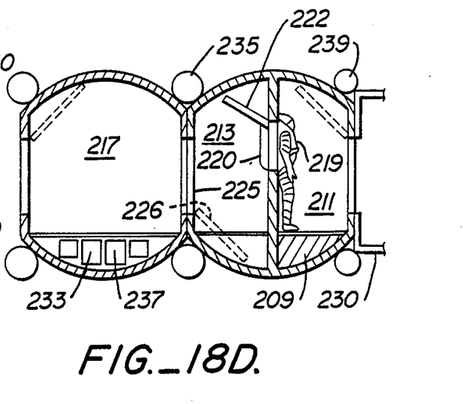
Figure 18E:
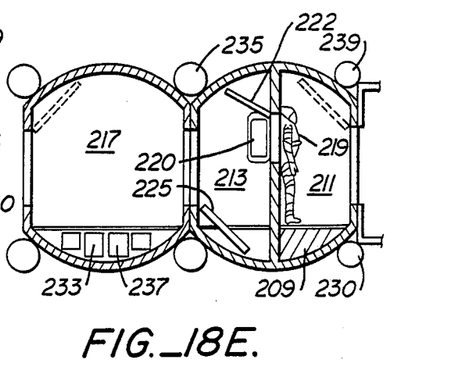

FIG. 18D illustrates the operation of the airlock module 201 as a hyperbaric chamber. This operational mode is outwardly similar to the mode of FIG. 18C, except that, instead of evacuating both the don/doff antechamber 213 and the pumpdown chamber 211 to vacuum together, they are instead pumped up to six atmospheres together. Hyperbaric pressurization is achieved by the use of high pressure air bottles in the form of spherical pressure vessels 235, mounted external to the EVA access facility in the "valley" between the airlock module 201 and the service module 203. There are two types of high pressure air bottles 235, i.e., 150 p.s.i. air bottles for receiving and storing normal pumpdown air and 3000 p.s.i. bottles for storing very high pressure air for pressurizing the hyperbaric chamber.

When used as a hyperbaric chamber, the crewmember afflicted with the bends or an embolism stays in the pumpdown chamber in his suit. A second crewmember enters the don/doff antechamber 213, and hatch 225 is sealed. The pumpdown chamber is pressurized rapidly to one atmosphere, hatch 221 is opened so that the paramedic trained support crew member can help with attaching the suited crew member to the wall and doffing the suit 219. If necessary, an AX-5 type suit can be disassembled from around the injured crew member without attaching the suit 219 to the suitport 215. Once the atmospheres between the antechamber 213 and the pumpdown chamber 211 are equalized, the hyperbaric pressurization can begin. This pressurization is controlled by a third crew member in the servicing chamber, who follows the verbal instructions of the paramedic crew member inside the hyperbaric environment, through an explosion-proof intercom system. There may also be an auxiliary set of manual controls inside the hyperbaric chamber that a crew member inside might use in an emergency situation, such as no other crew members on the station or access to the service chamber not possible from inside the station. High pressure air is delivered through a regulator from air bottles 235.

Once the afflicted astronaut is pressurized to 6 atmospheres, the pressure is slowly reduced. Pressurization is achieved by emptying the 3000 p.s.i. air bottles into the pumpdown chamber. Once hyperbaric pressure is achieved, pressure is reduced by bleeding the hyperbaric air back into the cabin atmosphere, which is then pressure balanced by the normal life support system function as the depressurization proceeds very slowly.

FIG. 18D shows normal suit part change, camera or light service mode. In this operational mode, all pressurizable portions of the EVA access facility are equalized at one atmosphere. All interior hatches 221, 225, 227 are opened and translated out of the way to their stowed positions 222, 226 and 228, respectively, to facilitate crew movement in and out of the pumpdown chamber. The crew members are thus able to perform normal suit 219 resizing or exchange of parts, or replace photographic film, light bulbs or batteries in the ancillary equipment associated with the space suits 219. When this service operation is completed, the EVA access facility returns to the nominal operational modes described in FIGS. 18A and 18B.

Figure 18F:
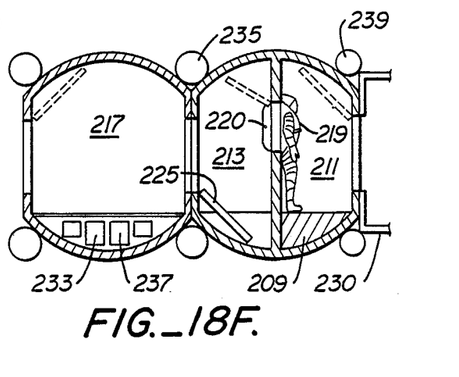

FIG. 18F shows the non-routine maintenance mode. In this operational mode, a suit 219 must be removed completely from the chamber 211 to the servicing chamber 217 pumpdown so that the crew can work on the suit without impairing the function of the airlock module as a second means of re-entry into the space station for crew members who would go EVA through the other EVA access facility on the station. In this respect, FIG. 18F is superficially similar to the routine operational mode described in FIGS. 18A and 18B. In this non-routine mode, with only one suit 219 secured to the bulkhead 205, it is not permissible for the crew to go EVA with the one remaining suit because of the strict buddy system protocol. The cabin pressure is protected by the hatch 220 in the suitport 215 without the suit. Thus, while the EVA access facility in this non-routine mode is available for contingency re-entry of the station, with pressurization of the pumpdown chamber to one atmosphere required. But in a non-routine mode, the EVA access facility is not available for egress from the station except on a contingency or emergency basis.

It should now be readily apparent to those skilled in the art that a novel suitport system capable of achieving the stated objects of the invention has been provided. The suitport system allows rapid egress from and ingress to a sealed environment, such as a space station, while wearing a protective suit, such as a space suit, on a routine basis. The suitport system therefore meets the requirements for space station EVA maneuvers. The suitport system allows egress and ingress through an airlock that remains pumped down during the egress and ingress.

It should further be apparent to those skilled in the art that various changes in form and details of the invention as shown and described may be made. It is intended that such changes be included within the spirit and scope of the claims appended hereto.

What is claimed is:

1. A suitport system for egress from and ingress to a sealed environment, which comprises a protective suit with a back having an access opening for donning and doffing said suit and a portable life support system releasably attached to said suit at said access opening, an airlock, a hatch connecting said airlock with the sealed environment, means for releasably attaching said suit at said hatch with said access opening sealed to and facing said hatch, a removable hatch cover for sealing said hatch, and means for releasably attaching said portable life support system to said hatch cover.

2. The suitport system of claim 1 additionally comprising means for equalizing pressure between said hatch cover and said suit to said airlock or to said sealed environment when said suit is attached to said hatch.

3. The suitport system of claim 2 additionally comprising a control operable from within said suit and connected to attach and remove said hatch cover to and from said hatch, to attach and remove said portable life support system to and from said suit, to operate said means for releasably attaching said suit at said hatch, and to operate said means for releasably attaching said portable life support system to said hatch cover.

4. The suitport system of claim 3 in which said suit includes a glove portion and said control comprises at least one vessel configured to receive said glove portion in sealing engagement against said vessel and to provide back pressure against said glove portion when said glove portion is exposed to a pressure greater than a pressure in said airlock.

5. The portable life support system of claim 4 in which said means for releasably attaching said suit at said hatch comprises at least one bar movable into and out of engagement between said suit and at least one flange at said hatch.

6. The portable life support system of claim 5 in which said at least one bar is mounted on said suit.

7. The portable life support system of claim 6 in which said means for releasably attaching said suit at said hatch comprises four bars positioned at each side, a top and a bottom of said access opening.

8. The portable life support system of claim 5 in which said means for releasably attaching said suit at said hatch includes a means for moving said at least one bar on said suit and mechanically coupled to said at least one bar.

9. The suitport system of claim 1 in which said means for releasably attaching said portable life support system to said hatch cover comprises a solenoid and a fitting for receiving an end of said solenoid, said solenoid and said fitting being positioned to extend between said hatch cover and said portable life support system.

10. The suitport system of claim 1 in which said portable life support system is attached to said suit by means of a flexible cable connection.

11. The suitport system of claim 1 in which the sealed environment is a space vessel.

12. The suitport system of claim 1 in which said airlock is connected by said hatch to an antechamber forming part of said sealed environment, said antechamber being configured for sealed isolation from a remainder of said sealed environment.

13. The suitport system of claim 12 additionally comprising a second hatch connecting said antechamber and said airlock, said suitport system including a means for equalizing pressure in said antechamber and said airlock with pressure in said sealed environment and external to said sealed environment 14. The suitport system of claim 13 additionally comprising a means for creating a pressure in said airlock in excess of the pressure in said sealed environment.

15. The suitport system of claim 13 in which said airlock and said antechamber are detachable from said sealed environment.

* * * * *